United States Patent
Park

(10) Patent No.: US 9,756,597 B1
(45) Date of Patent: Sep. 5, 2017

(54) USER EQUIPMENT (UE) ATTACHMENT TO MULTIPLE MOBILITY MANAGEMENT ENTITIES (MMES) FOR MULTIPLE DATA SERVICES

(71) Applicant: Sprint Communications Company L.P., Overland Park, KS (US)

(72) Inventor: Sunyong Park, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/221,070

(22) Filed: Jul. 27, 2016

(51) Int. Cl.
*H04W 4/00* (2009.01)
*H04W 60/00* (2009.01)
*H04L 12/761* (2013.01)
*H04W 8/06* (2009.01)
*H04W 8/08* (2009.01)
*H04W 72/04* (2009.01)
*H04W 84/04* (2009.01)

(52) U.S. Cl.
CPC .......... *H04W 60/005* (2013.01); *H04L 45/16* (2013.01); *H04W 8/06* (2013.01); *H04W 8/08* (2013.01); *H04W 72/0406* (2013.01); *H04W 84/042* (2013.01)

(58) Field of Classification Search
CPC ... H04W 60/005; H04W 84/042; H04W 8/06; H04W 8/08; H04W 72/0406; H04L 24/16

USPC ........ 455/435.1, 435.2, 552.1; 370/252, 329, 370/331, 328
See application file for complete search history.

(56) References Cited

U.S. PATENT DOCUMENTS

| | | | |
|---|---|---|---|
| 8,971,886 B2 | 3/2015 | Kotecha | |
| 9,001,682 B2 | 4/2015 | Kovvali et al. | |
| 9,271,197 B2 | 2/2016 | Kaippallimalil et al. | |
| 9,326,229 B2 | 4/2016 | Yokota | |
| 2010/0322128 A1* | 12/2010 | Becker | H04W 4/08 370/312 |
| 2011/0176530 A1 | 7/2011 | Vikberg et al. | |
| 2012/0201215 A1 | 8/2012 | Shaheen | |
| 2013/0083650 A1 | 4/2013 | Taleb et al. | |
| 2014/0241317 A1 | 8/2014 | Jamadagni et al. | |
| 2015/0063296 A1 | 3/2015 | Noma et al. | |
| 2016/0007331 A1* | 1/2016 | Gauba | H04W 72/0406 370/329 |
| 2017/0078867 A1* | 3/2017 | Ianev | H04W 8/065 |

* cited by examiner

*Primary Examiner* — Khai M Nguyen

(57) ABSTRACT

A wireless base station receives signaling from User Equipment (UE) that indicates multiple data services. The base station transfers signaling indicating the data services to a Mobility Management Entity (MME). The MME selects individual MMEs to support the individual data services and transfers signaling indicating the MME/service combinations. The base station receives the MME/service combinations and transfers signaling to the selected MMEs indicating their data services for the UE. The MMEs perform session control for the data services for the UE. The MMEs also exchange Non-Access Stratum (NAS) signaling for the data services with the UE over the wireless base station.

20 Claims, 6 Drawing Sheets

USER EQUIPMENT (UE) ATTACHMENT TO MULTIPLE MOBILITY MANAGEMENT ENTITIES (MMES) FOR MULTIPLE DATA SERVICES

TECHNICAL BACKGROUND

Data communication systems exchange user data with User Equipment (UEs) to provide various data communication services. The UEs may be phones, computers, media players, and the like. The data communication services may be Internet access, voice/video calling, messaging, evolved Multimedia Broadcast Multicast Service (eMBMS), location-based services, local bulletin (news/traffic/weather), vehicle services (V2X), group communications, enterprise access, or some other computerized information services.

A popular wireless communication technology is Long Term Evolution (LTE). LTE networks use wireless base stations called evolved Node Bs (eNodeBs) to connect the UEs to LTE network cores. The LTE network cores comprise network elements like Mobility Management Entities (MMEs), gateways, controllers, routers, databases, and servers. A UE is often attached to a default MME for its serving eNodeB. The MME orchestrates session control over the LTE network elements to deliver multiple data services to the UE. The MME exchanges Non-Access Stratum (NAS) signaling for the data services with the UE over the eNodeB. The UE exchanges user data for the data services with gateways systems over the eNodeB.

The default MME may select another MME to replace itself based on UE mobility or MME loading. The eNodeBs handle these types of MME hand-overs, but the eNodeBs are not efficient and effective when attaching a UE to multiple MMEs for multiple data services. In addition, the MMEs do not cooperate effectively in this multi-service, multi-MME environment.

TECHNICAL OVERVIEW

A wireless base station receives signaling from User Equipment (UE) that indicates multiple data services. The base station transfers signaling indicating the data services to a Mobility Management Entity (MME). The MME selects individual MMEs to support the individual data services and transfers signaling indicating the MME/service combinations. The base station receives the MME/service combinations and transfers signaling to the selected MMEs indicating their data services for the UE. The MMEs perform session control for the data services for the UE. The MMEs also exchange Non-Access Stratum (NAS) signaling for the data services with the UE over the wireless base station.

DETAILED DESCRIPTION

Figure 1:
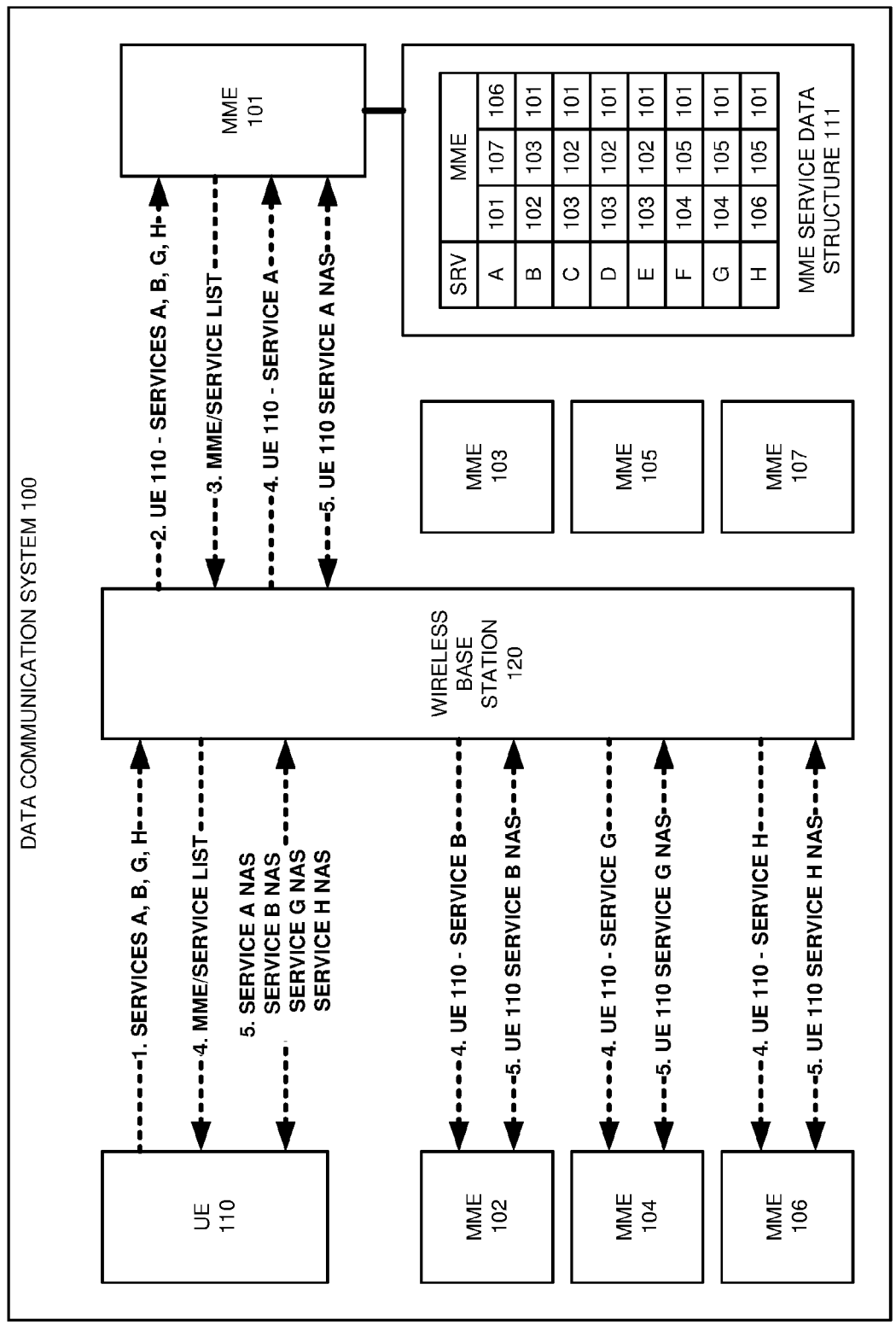
FIG. 1 illustrates a data communication system to attach User Equipment (UE) to multiple Mobility Management Entities (MMEs) to support multiple data services.

FIG. 1 illustrates data communication system 100 to attach User Equipment (UE) 110 to Mobility Management Entities (MMEs) 101-107 to support multiple data services which are generally referred to herein as data services A-H. Exemplary data services comprise internet access, voice/video calling, messaging applications, streaming media applications, evolved Multimedia Broadcast Multicast Service (eMBMS), location-based applications, local bulletin (news/traffic/weather), vehicle applications (V2X), group communications, enterprise network access, or some other computerized information service. Data communication system 100 comprises MMEs 101-107, UE 110, MME service data structure 111, and wireless base station 120.

UE 110 comprises a computer, phone, media player, or some other intelligent machine with a communication transceiver. UE 110 stores Service Indicators (SIs) that individually identify data services A-H. UE 110 may be pre-configured with its SIs or receive them from Service Information Blocks (SIBs), over-the-air device management sessions, downloaded applications, or some other data source. UE 110 will include the individual SIs for requested data services in the Radio Resource Control (RRC) attachment signaling that it transmits to wireless base station 120.

Wireless base station 120 comprises a Long Term Evolution (LTE) evolved Node B (eNodeB), LTE relay, 5G base station, Wireless Fidelity (WIFI) hotspot, LTE/WIFI Aggregation (LWA) node, or some other wireless access point. Wireless base station 120 includes an intelligent interface to support multiple data services between UE 110 and MMEs 101-107.

MMEs 101-107 comprise data processing circuitry, data memory, data communication transceivers, and operating software. MMEs 101-107 direct LTE network elements to deliver LTE connectivity for the data services. MMEs 101-107 comprise Software Defined Network (SDN) applications and/or Network Function Virtualization (NFV) Virtual Network Functions (VNFs).

MME service data structure 111 comprises a database that may be hosted by an MME, Home Subscriber System (HSS), or some other computer system. MME service data structure 111 individually correlates the data services to the MMEs in an ordered manner. For example, the first choice for data service A (SRV A) is MME 101 followed by MME 107 and then MME 106.

In operation #1, UE 110 transfers LTE RRC signaling to wireless base station 120 that includes SIs to indicate user-requested data services A, B, G, and H. The RRC signaling may be a connection request, set-up complete, or other RRC message. The RRC signaling may have a convenient indicator bit that identifies the presence of the SIs elsewhere in the RRC signaling. Note that the RRC connect message includes the standard Establishment Cause in addition to the SIs.

In operation #2, wireless base station 120 transfers network-attachment signaling with SIs to indicate the requested data services A, B, G, and H for UE 110. The network-attachment signaling may be S1-MME Initial UE signaling. MME 101 receives the network-attachment signaling having the SIs to indicate the requested data services. MME 101 enters MME service data structure 111 with the individual SIs for data service A, B, G, and H to yield the respective MMEs 101, 102, 104, and 106 for the data services. MME 101 might be a default MME for UE 110, a multi-service MME for UE 110, or the last MME used by UE 110.

In operation #3, MME 101 transfers network-attachment signaling indicating the MME/data service combinations: 101/A, 102/B, 104/G, and 106/H. The network-attachment signaling may be S1-MME initial context setup request signaling. Wireless base station 120 receives the network-attachment signaling indicating the MME/data service combinations.

In operation #4, wireless base station 120 transfers service-attachment signaling indicating UE 110 and data services A, B, G, and H to MMEs 101, 102, 104, and 106. The service-attachment signaling may be S1-MME Initial UE signaling. MMEs 101, 102, 104, and 106 each receive their service-attachment signaling. In response, MMEs 101, 102, 104, and 106 each exchange service-attachment signaling with various service gateways to support the requested data services for UE 110. The service-attachment signaling may comprise S11 Create Session signaling and the service gateways may comprise Serving Gateways (S-GWs), Packet Data Network Gateways (P-GWs), and the like. Wireless base station 120 may also transfer RRC signaling to UE 110 indicating the MME/data service combinations: 101/A, 102/B, 104/G, and 106/H.

In operation #5, MMEs 101, 102, 104, and 106 each exchange Non-Access Stratum (NAS) signaling for UE 110 with wireless base station 110. Wireless base station 120 exchanges the NAS signaling between individual MMEs 101, 102, 104, and 106 and UE 110. Wireless base station 120 also exchanges user data for data services A, B, G, and H between UE 110 and the service gateways invoked by MMEs 101, 102, 104, and 106.

Figure 2:
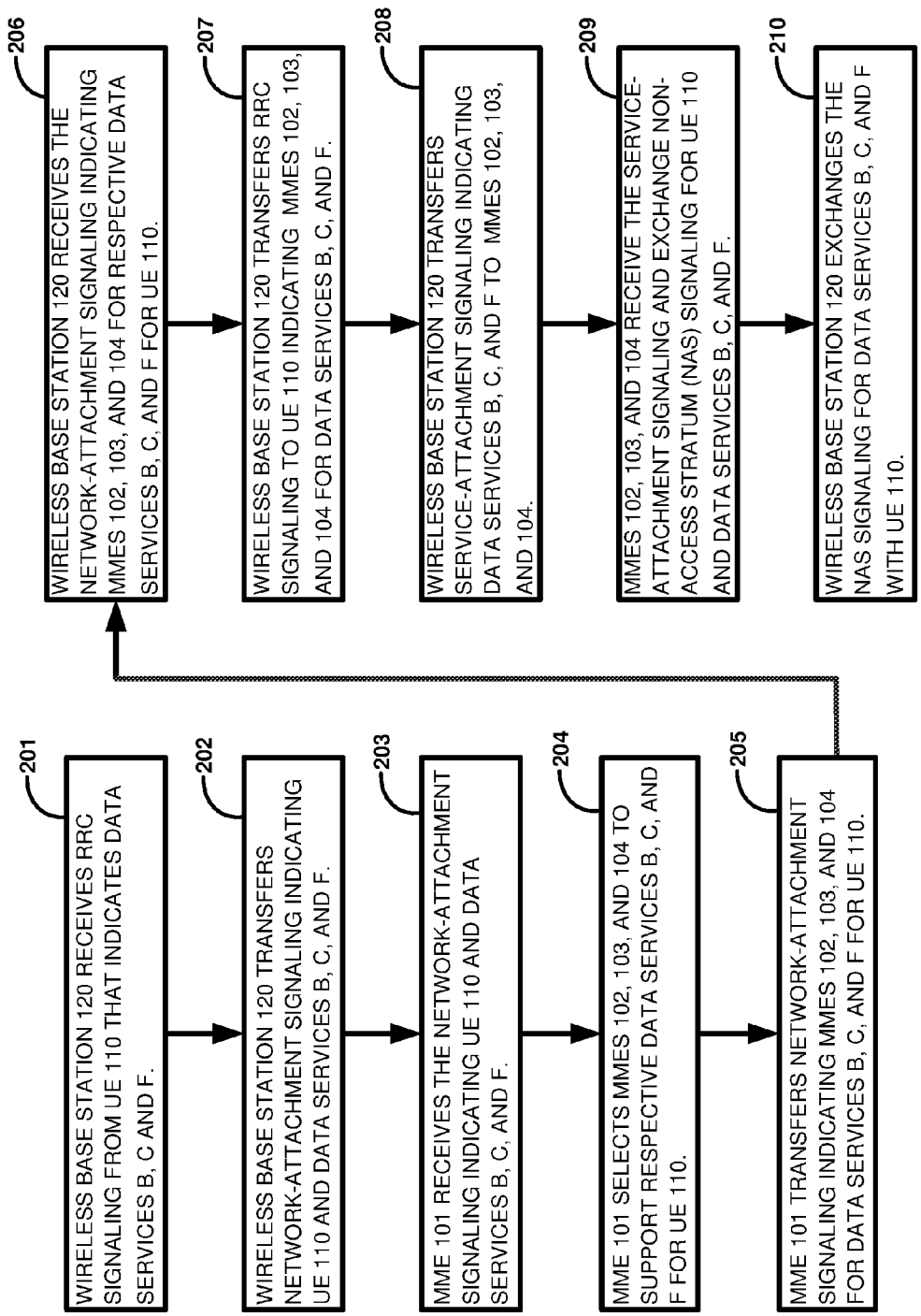
FIG. 2 illustrates the operation of the data communication system to attach the UE to multiple MMEs to support multiple data services.

FIG. 2 illustrates the operation of data communication system 100 to attach UE 110 to MMEs 101-107 for various data services. In this example, wireless base station 120 receives LTE RRC signaling from UE 110 having SIs for requested data services B, C, and F (201). Wireless base station 120 transfers network-attachment signaling that indicates the requested data services B, C, and F for UE 110 to MME 101 (202). The network-attachment signaling may be S1-MME Initial UE signaling. MME 101 receives the network-attachment signaling for UE 110 with SIs that indicate the requested data services B, C, and F (203). MME 101 enters MME service data structure 111 with the individual SIs for data service B, C, and F for UE 110 to yield the respective MMEs 102, 103, and 104 (204).

MME 101 transfers network-attachment signaling indicating the MME/data service combinations: 102/B, 103/C, and 104/F (205). The network-attachment signaling may be S1-MME initial context setup request signaling. Wireless base station 120 receives the network-attachment signaling indicating the MME/data service combinations (206). Wireless base station 120 transfers RRC signaling to UE 110 indicating the MME/data service combinations: 102/B, 103/C, and 104/F (207).

Wireless base station 120 transfers service-attachment signaling for data services B, C, and F to MMEs 102, 103, and 104 (208). The service-attachment signaling may be S1-MME Initial UE signaling. MMEs 102, 103, and 104 each receive their service-attachment signaling (209). In response, MMEs 102, 103, and 104 typically exchange service-attachment signaling with various service gateways to support the requested data services B, C, and F for UE 110. This service-attachment signaling may comprise S11 Create Session signaling to an S-GW. MMEs 102, 103, and 104 also exchange NAS signaling for UE 110 with wireless base station 110 (209). Wireless base station 120 exchanges the NAS signaling between individual MMEs 102, 103, and 104 and UE 110 (210). Wireless base station 120 also exchanges user data for data services B, C, and F between UE 110 and the service gateways invoked by MMEs 102, 103, and 104.

Figure 3:
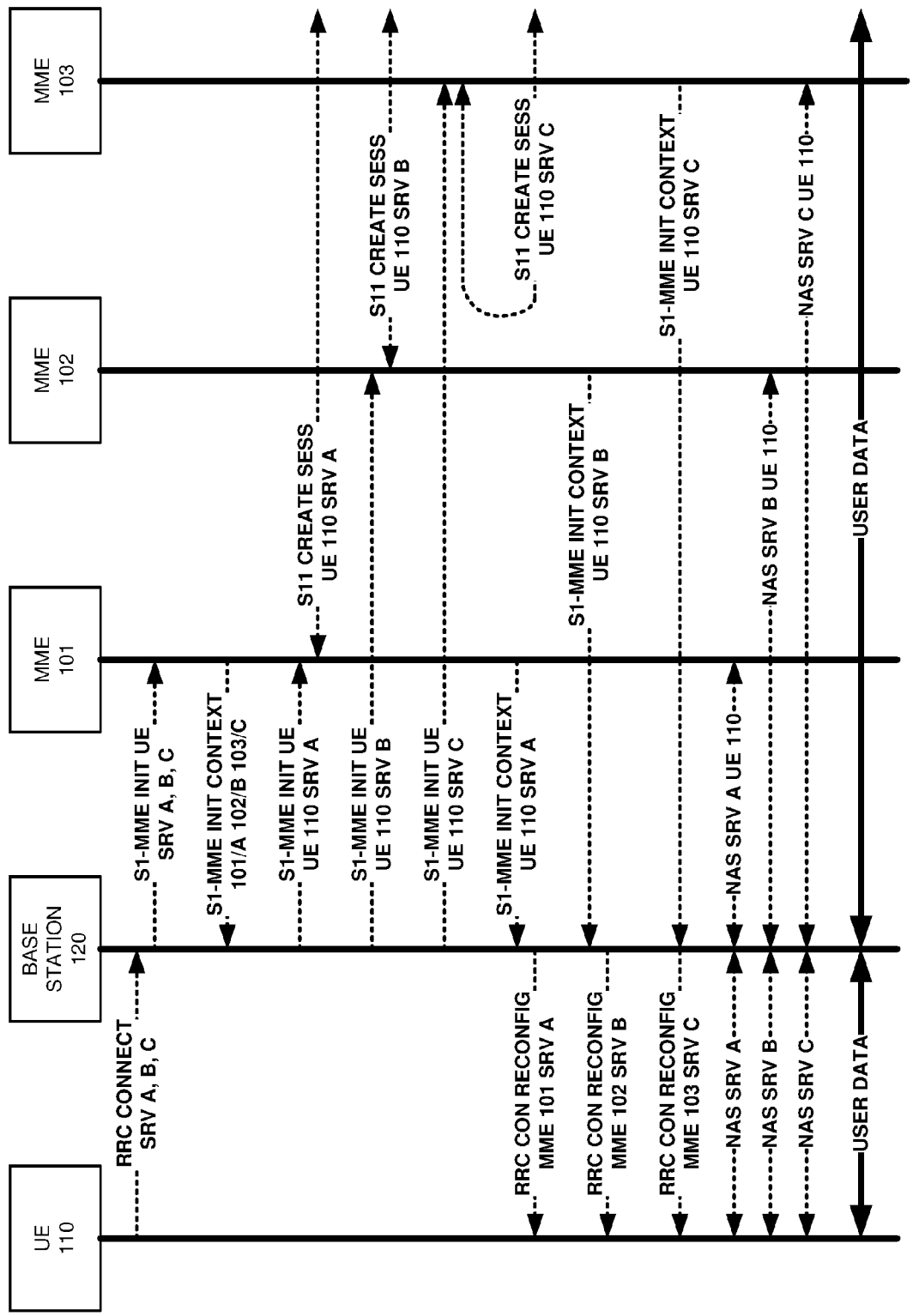
FIG. 3 illustrates the operation of the data communication system to attach the UE to multiple MMEs to support multiple data services.

FIG. 3 illustrates an exemplary LTE operation of data communication system 100 to attach UE 110 to multiple MMEs 101-107 for multiple data services. In this LTE example, UE 110 transfers RRC Connection signaling to wireless base station 120 that includes SIs for requested data services A, B, and C. In response to the SIs, wireless base station 120 transfers S1-MME Initial UE signaling for UE 110 with the SIs for requested data services A, B, and C. MME 101 receives the S1-MME Initial UE signaling having the SIs. MME 101 uses MME service data structure 111 to translate the individual SIs for data service A, B, and C into the respective MMEs 101, 102, and 103 for these data services.

MME 101 transfers S1-MME Initial Context Setup Request signaling indicating the MME/data service combinations: 101/A, 102/B, and 103/C to wireless base station 120. In response to the S1-MME Initial Context Setup Request signaling, wireless base station 120 transfers S1-MME Initial UE signaling indicating UE 110 and data service A to MME 101. In response to the S1-MME Initial UE signaling, MME 101 exchanges S11 Create Session signaling with a service gateway to support data service A for UE 110. In response to the S1-MME Initial Context Setup Request signaling, wireless base station 120 transfers S1-MME Initial UE signaling indicating UE 110 and data service B to MME 102. In response to the S1-MME Initial UE signaling, MME 102 exchanges S11 Create Session signaling with a service gateway to support data service B for UE 110. In response to the S1-MME Initial Context Setup Request signaling, wireless base station 120 transfers S1-MME Initial UE signaling indicating UE 110 and data service C to MME 101. In response to the S1-MME Initial UE signaling, MME 101 exchanges S11 Create Session signaling with a service gateway to support data service C for UE 110.

In response to the S11 Create Session signaling, MME 101 transfers S1-MME Initial Context Setup Request signaling for UE 110 and data service A to wireless base station 120. In response to the S1-MME Initial Context Setup Request signaling from MME 101, wireless base station 120 transfers RRC Connection Reconfiguration signaling to UE 110 indicating MME 101 and the service gateway for data service A. In response to the S11 Create Session signaling, MME 102 transfers S1-MME Initial Context Setup Request signaling for UE 110 and data service B to wireless base station 120. In response to the S1-MME Initial Context Setup Request signaling from MME 102, wireless base station 120 transfers RRC Connection Reconfiguration signaling to UE 110 indicating MME 102 and the service gateway for data service B. In response to the S11 Create Session signaling, MME 103 transfers S1-MME Initial Context Setup Request signaling for UE 110 and data service C to wireless base station 120. In response to the S1-MME Initial Context Setup Request signaling from MME 103, wireless base station 120 transfers RRC Connection Reconfiguration signaling to UE 110 indicating MME 103 and the service gateway for data service C.

MME 101 and wireless base station 110 exchange NAS signaling for UE 110 and data service A. Wireless base station 120 exchanges the NAS signaling for data service A with UE 110. MME 102 and wireless base station 110 exchange NAS signaling for UE 110 and data service B. Wireless base station 120 exchanges the NAS signaling for data service B with UE 110. MME 103 and wireless base station 110 exchange NAS signaling for UE 110 and data service C. Wireless base station 120 exchanges the NAS signaling for data service C with UE 110. UE 110 and wireless base station 120 exchange user data for data services A, B, and C. Wireless base station 120 exchanges the user data for data services A, B, and C with the service gateways invoked by MMEs 101, 102, and 103.

Figure 4:
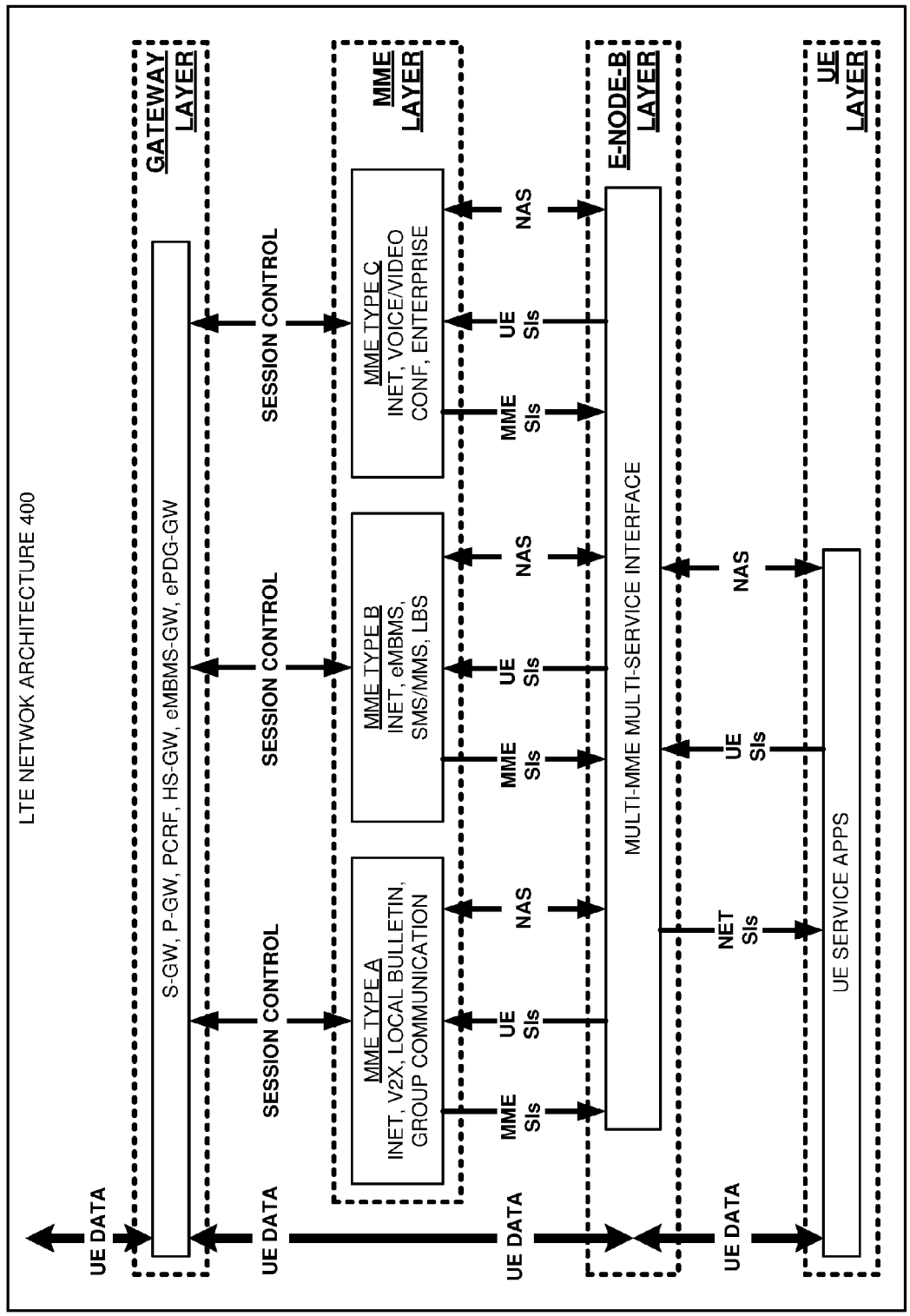
FIG. 4 illustrates a Long Term Evolution (LTE) network architecture to deliver multiple data services to a UE using multiple MMEs.

FIG. 4 illustrates LTE network architecture 400 to deliver multiple data services to a UE using multiple MMEs. LTE architecture 400 is an example of data communication system 100, although system 100 may use alternative configurations and operations. LTE architecture 400 comprises a UE layer, eNodeB layer, MME layer, and Gateway layer. The UE layer comprises intelligent machines with communication transceivers like computers, phones, and media players. The eNodeB layer comprises wireless base stations with LTE capability. The MME layer comprises MMEs and HSSs that support different combinations of network services. The Gateways layer includes S-GWs, P-GWs, eMBMS-GWs, HS-GWs, ePDGWs, V2X-GWs, enterprise-GWs, and the like.

The MME layer has MME types A, B, and C. Type A MMEs manage services like internet access (INET), V2X, local bulletin, and group communications. Type B MMEs manage services like INET, Short Messaging Service (SMS), Multimedia Messaging Service (MMS), evolved Multimedia Broadcast Multicast Service (eMBMS), Location-Based Services (LBS). Type C MMEs manage all services including INET, voice/video conferencing, enterprise services, V2X, local bulletin, group communications, SMS/MMS, eMBMS, and LBS.

The MME layer associates the various data services offered by the Gateway layer with individual MMEs. The MME layer transfers Service Indicators (SIs) to the eNodeB layer indicating the data services. The eNodeB layer aggregates the SIs and transfers the aggregated SIs to the UE layer. The UE layer identifies service applications (APPS) and includes the specific SIs for identified service applications in attachment signaling to the eNodeB layer. For example, an eMBMS smartphone APP may cause the phone to transfer an eMBMS SI to the eNodeB layer during LTE attachment. This attachment signaling from the UE layer may comprise RRC messages with standard Establishment Causes in addition to the SIs to indicate the requested data services.

The eNodeB layer transfers the UE SIs to the MME layer. The MME layer selects MMEs for the SIs and indicates the MME/service combinations to the eNodeB layer. The eNodeB layer transfers the SIs to the selected MMEs in the MME layer. The selected MMEs in the MME layer exchange session control signaling for the SIs with the Gateway layer. The MME layer and the UE layer exchange NAS for the data services over the eNodeB layer. The UE layer and the Gateway layer exchange user data for the data services over the eNodeB layer.

Many LTE networks comprise Network Function Virtualization Infrastructures (NFVIs) that execute Network Function Virtualization (NFV) Virtual Network Functions (VNFs). These NFV VNFs often comprise SDN applications and controllers. In turn, the SDN application VNFs may comprise base-band units, base station controllers, MMEs, S-GWs, P-GWs, HSS, PCRFs, V2X servers, eMBMS servers, group communication servers, local bulletin servers, enterprise servers, and the like. The NFVIs, NFV Network Service Descriptors (NSDs), VNF Forwarding Graphs (VNFFGs), and/or SDN applications may be individually associated with specific data services at the MME layer. Thus, the MME layer may process SIs to select MMEs based on a specific VNFFG that is operating in a selected NFVI. The MME layer may process the SIs to select MMEs based on a selected SDN application VNF that executes in an NFVI that also executes the selected MMEs.

Figure 5:
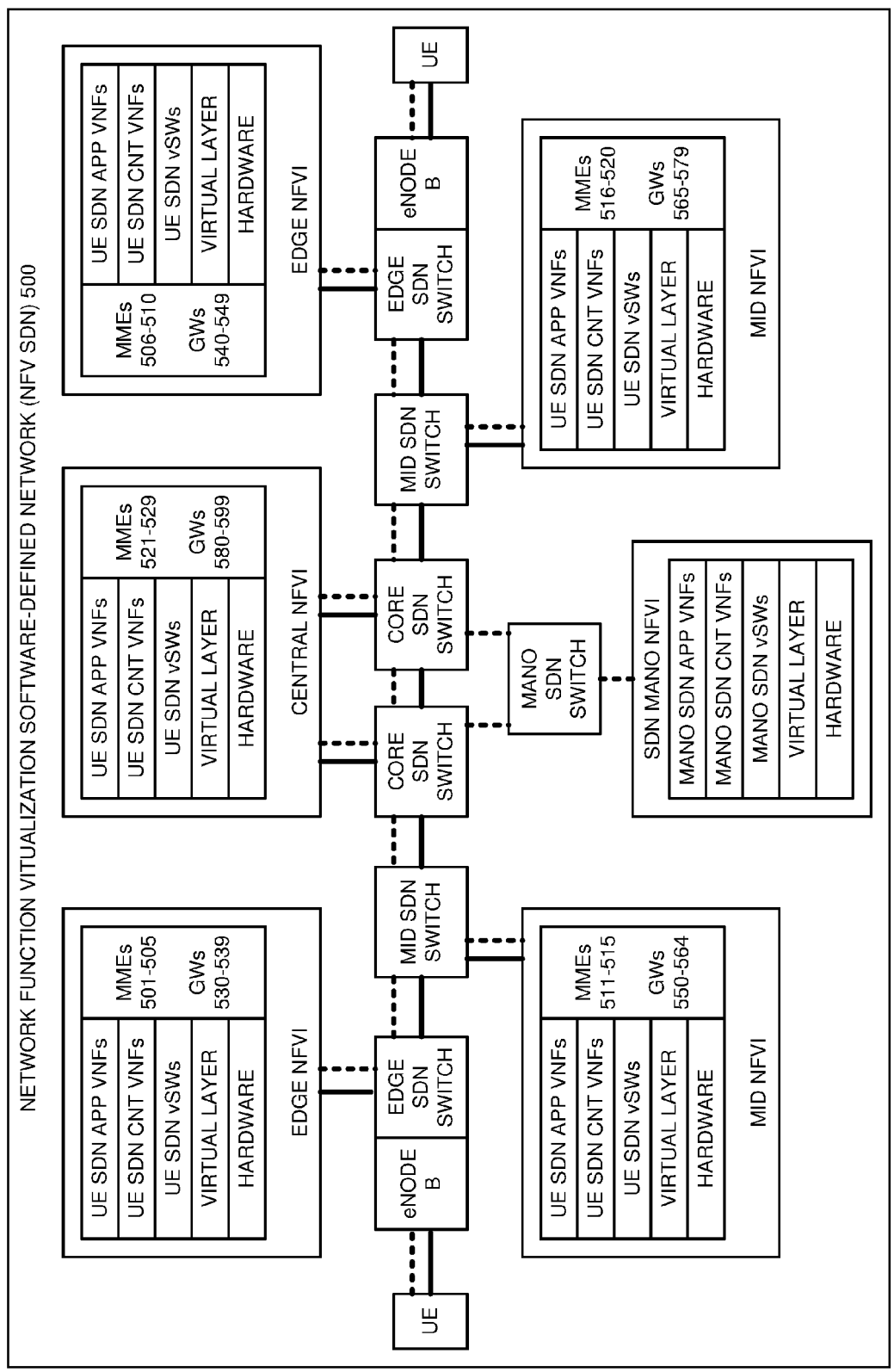
FIG. 5 illustrates a Network Function Virtualization (NFV) Software-Defined Network (SDN) to deliver multiple data services to a UE using multiple MMEs.

FIG. 5 illustrates a Network Function Virtualization (NFV) Software-Defined Network (SDN) to deliver multiple data services to a UE using multiple MMEs. NFV SDN 500 is an example of data communication system 100, although system 100 may use alternative configurations and operations. NFV SDN 500 comprises: User Equipment (UE), edge SDN switches with wireless eNodeBs, mid SDN switches, core SDN switches, a MANO SDN switch, edge NFVIs, mid NFVIs, a core NFVI, and an SDN MANO NFVI. The NFVIs comprise hardware such as CPU cores, flash memories, and I/O transceivers. The top-left edge NFVI hosts MMEs 501-505 and GWs 530-539. The top-right edge NFVI hosts MMEs 506-510 and GWs 540-549. The left mid NFVI hosts MMEs 511-515 and GWs 550-564. The right mid NFVI hosts MMEs 516-520 and GWs 565-579. The central NFVI hosts LTE cores 521-529 and GWs 580-599.

The NFVIs execute virtual layer software to provide a virtualized processing environment. Under the control of the MANO system, the virtual layers execute various SDN VNFs. In the edge, mid, and core NFVIs, the virtual layers execute UE SDN virtual switch (vSW) VNFs, UE SDN controller (CNT) VNFs, and UE SDN application (APP) VNFs. In the MANO NFVI, the virtual layer executes MANO SDN vSW VNFs, MANO SDN CNT VNFs, MANO SDN APP VNFs. The MANO VNFs transfer networking data to the edge, mid, and core NFVI virtual layers to drive the execution of the UE SDN VNFs. The UE SDN APP VNFs in the edge NFVIs typically include a multitude of eNodeB control VNFs.

The UE SDN APP VNFs for GWs 530-599 transfer Service Indicators (SIs) to the UE SDN APP MME VNFs. The SIs identify individual data services for each GW, NFVI, NFV NS SD, VNFFG, and SDN APP VNF. UE SDN APP MME VNFs aggregate the SIs into service data structures that individually associate individual MME VNFs with individual data services and other NFV/SDN data.

Upon UE attachment, an SDN APP eNodeB VNF receives SIs from the UE. The eNodeB VNF transfers UE SIs to an SDN APP MME VNF. The MME VNF enters its core service data structure with the SIs to select an MME VNF for each SI. In response to the MME VNF selection, the original MME VNF identifies the UE and the selected MME VNFs to the eNodeB VNF. The eNodeB VNF invokes the selected MME VNFs to serve the SIs. The selected MME VNFs invoke GW VNFs to serve the SIs. The MME VNFs also exchange NAS signaling with the UE over the eNodeB VNFs. The GW VNFs direct the exchange of user data with the UE over the SDN switches.

Figure 6:
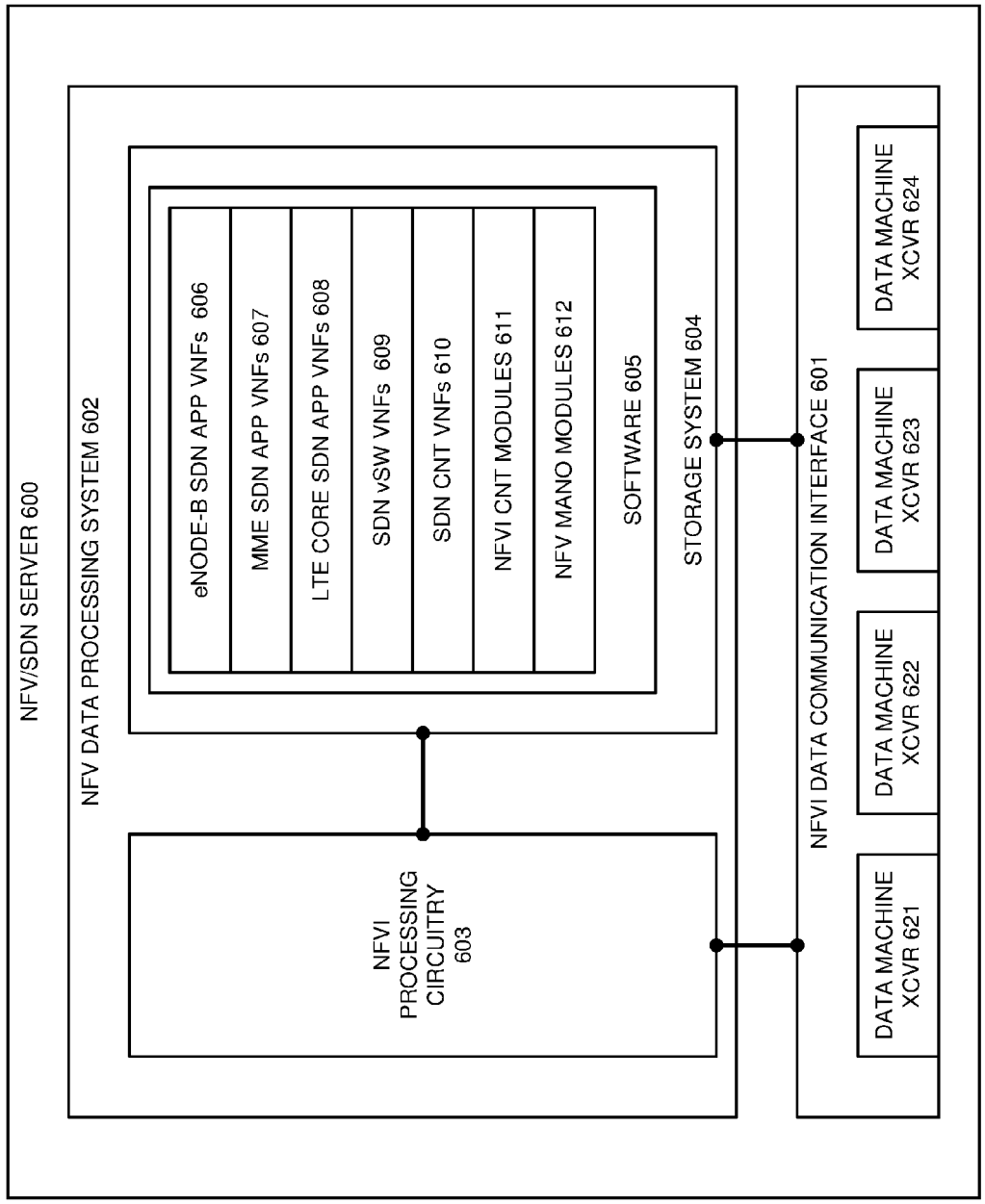
FIG. 6 illustrates an NFV/SDN server to deliver multiple data services to a UE using multiple MMEs.

FIG. 6 illustrates NFV/SDN server 600 to deliver multiple data services to a UE using multiple MMEs. NFV/SDN server 600 is an example of data communication system 100, although system 100 may use alternative configurations and operations. NFV/SDN server 600 comprises data communication interface 601 and data processing system 602. Data communication interface 601 comprises data machine transceivers 621-624. Data processing system 602 comprises processing circuitry 603 and storage system 604. Storage system 604 stores software 605. Software 605 includes respective software modules 606-612.

Data machine transceivers 621-624 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. Software 605 includes software modules 606-612. NFV/SDN server 600 may be centralized or distributed. All or portions of software 606-612 may be externally stored on one or more storage media, such as circuitry, discs, and the like. Some conventional aspects of SDN server 600 are omitted for clarity, such as power supplies, enclosures, and the like.

When executed by processing circuitry 603, software modules 606-612 direct circuitry 603 to perform the following operations. eNodeB SDN application VNFs 606 drive base station operations including the interfacing of individual UEs with multiple MMEs. MME SDN application VNFs 607 drive network operations like UE service authorization, MME selection, Access Point Name (APN) assignment, and mobility management. LTE core SDN application VNFs 608 perform gateway management and transfer service data to MME SDN application VNF modules 607. SDN vSW modules 609 provide SDN north/south and east/west interfaces to VNF modules 606-608 and 610. SDN CNT VNF modules 610 expose an SDN Application Programming Interface (API) to SDN modules 606-608 to control SDN data machines in the field. NFVI control modules 611 include hypervisors and virtual machines to create the virtualized networking environment. NFVI MANO modules 612 include orchestrators, VNF Managers (VNFMs) and Virtual Infrastructure Managers (VIMs) to control the operation of the NFVIs and VNFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication network to serve User Equipment (UE) with multiple Mobility Management Entities (MMEs), the method comprising:
   a wireless base station receiving Radio Resource Control (RRC) signaling that indicates multiple data services and transferring network-attachment signaling indicating the multiple data services;
   one of the multiple MMEs receiving the network-attachment signaling indicating the multiple data services, selecting the other ones of the multiple MMEs to support the multiple data services, and transferring additional network-attachment signaling indicating the multiple MMEs;
   the wireless base station receiving the additional network-attachment signaling indicating the multiple MMEs and transferring service-attachment signaling indicating the multiple data services;
   the multiple MMEs each receiving at least a portion of the service-attachment signaling and transferring Non-Access Stratum (NAS) signaling for the UE; and
   the wireless base station transferring the NAS signaling between the multiple MMEs and the UE to support the multiple data services.

2. The method of claim 1 wherein the network-attachment signaling comprises S1-MME Initial UE signaling.

3. The method of claim 1 wherein the network-attachment signaling has a multi-service request indicator.

4. The method of claim 1 wherein the network-attachment signaling comprises multiple service identifiers to indicate the multiple data services.

5. The method of claim 1 wherein the additional network-attachment signaling comprises S1-MME Initial Context Set-up signaling.

6. The method of claim 1 wherein the service-attachment signaling comprises S1-MME Initial UE signaling having service identifiers to indicate the data services.

7. The method of claim 1 further comprising the multiple MMEs transferring S11 Create Session signaling to data service gateways for the multiple data services for the UE.

8. The method of claim 1 wherein the multiple MMEs comprise Software Defined Network (SDN) applications.

9. The method of claim 1 wherein the multiple MMEs comprise Network Function Virtualization (NFV) Virtual Network Functions (VNFs).

10. The method of claim 1 wherein the wireless base station comprises a Long Term Evolution (LTE) evolved Node B (eNodeB).

11. A data communication network to serve User Equipment (UE) with multiple Mobility Management Entities (MMEs), the data communication network comprising:
    a wireless base station configured to receive Radio Resource Control (RRC) signaling that indicates multiple data services and transfer network-attachment signaling indicating the multiple data services;
    one of the multiple MMEs configured to receive the network-attachment signaling indicating the multiple data services, select the other ones of the multiple MMEs to support the multiple data services, and transfer additional network-attachment signaling indicating the multiple MMEs;
    the wireless base station configured to receive the additional network-attachment signaling indicating the multiple MMEs and transfer service-attachment signaling indicating the multiple data services;
    the multiple MMEs each configured to receive at least a portion of the service-attachment signaling and transfer Non-Access Stratum (NAS) signaling for the UE; and
    the wireless base station configured to transfer the NAS signaling between the multiple MMEs and the UE to support the multiple data services.

12. The data communication network of claim 11 wherein the network-attachment signaling comprises S1-MME Initial UE signaling.

13. The data communication network of claim 11 wherein the network-attachment signaling has a multi-service request indicator.

14. The data communication network of claim 11 wherein the network-attachment signaling comprises multiple service identifiers to indicate the multiple data services.

15. The data communication network of claim 11 wherein the additional network-attachment signaling comprises S1-MME Initial Context Set-up signaling.

16. The data communication network of claim 11 wherein the service-attachment signaling comprises S1-MME Initial UE signaling having service identifiers to indicate the data services.

17. The data communication network of claim 11 further comprising the multiple MMEs each configured to transfer S11 Create Session signaling to data service gateways for the multiple data services for the UE.

18. The data communication network of claim 11 wherein the multiple MMEs comprise Software Defined Network (SDN) applications.

19. The data communication network of claim 11 wherein the multiple MMEs comprise Network Function Virtualization (NFV) Virtual Network Functions (VNFs).

20. The data communication network of claim 11 wherein the wireless base station comprises a Long Term Evolution (LTE) evolved Node B (eNodeB).

* * * * *